US006376069B1

(12) United States Patent
Bilodeau et al.

(10) Patent No.: US 6,376,069 B1
(45) **Date of Patent: *Apr. 23, 2002**

(54) HEAT-TRANSFER LABEL INCLUDING NON-WAX RELEASE LAYER

(75) Inventors: Wayne L. Bilodeau, Mentor, OH (US); James S. Nugent, Hudson, MA (US); Kuolih Tsai, Arcadia, CA (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,336

(22) Filed: Jun. 25, 1999

(51) Int. Cl.[7] .............................. B32B 7/06; C09J 7/02

(52) U.S. Cl. ....................... 428/348; 428/202; 428/352; 428/354; 428/355 R; 428/480; 428/483

(58) Field of Search ................................ 428/914, 348, 428/202, 347, 349, 352, 354, 355 R, 480, 483

(56) References Cited

U.S. PATENT DOCUMENTS

| | | | | | |
|---|---|---|---|---|---|
| 3,922,435 | A | | 11/1975 | Asnes | |
| 4,319,974 | A | | 3/1982 | Crivello | |
| 4,426,422 | A | * | 1/1984 | Daniels | 428/352 |
| 4,548,857 | A | * | 10/1985 | Galante | 428/200 |
| 4,927,709 | A | | 5/1990 | Parker et al. | |
| 4,935,300 | A | | 6/1990 | Parker et al. | |
| 5,314,929 | A | | 5/1994 | Crivello et al. | |
| 5,350,612 | A | * | 9/1994 | Stern et al. | 428/348 X |
| 5,800,656 | A | | 9/1998 | Geurtsen et al. | |
| 6,042,676 | A | * | 3/2000 | Stein | 428/348 X |

FOREIGN PATENT DOCUMENTS

| | | |
|---|---|---|
| EP | 0 819 726 | 1/1998 |
| EP | 0 824 251 | 2/1998 |
| WO | PCT/US89/01731 | 2/1990 |
| WO | PCT/EP97/00642 | 8/1997 |

OTHER PUBLICATIONS

English translation of European Patent Appln. No. 0 824 251.

Technical literature regarding Sartomer SR 9003 propoxylated neopentyl glycol diacrylate, Sartomer Company, Exton, PA, published before filing date of present application.

Technical literature regarding RAPI–CURE ODVE octadecylvinyl ether, ISP Technologies, Inc., Wayne, NJ, published before filing date of present application.

Product Application Bulletin for Sartomer SR–492 Three Mole Propoxylated TMPTA, Sartomer Company, Exton, PA, published Jul., 1992.

Technical literature for Irgacure 500 photoinitiator, Ciba–Geigy, published before the filing of the present application.

* cited by examiner

*Primary Examiner*—Daniel Zirker
(74) *Attorney, Agent, or Firm*—Kriegsman & Kriegsman

(57) ABSTRACT

A heat-transfer label including a non-wax, non-silicone release layer for use in decorating an article without leaving a visually discernible release residue on the decorated article. In a preferred embodiment, the label includes a transfer portion comprising a protective lacquer layer, an ink design layer over the protective lacquer layer, and a heat-activatable adhesive layer over the ink design and protective lacquer layers, the adhesive layer extending beyond the peripheries of the ink design and protective lacquer layers. The adhesive layer preferably includes a polyester resin and an anti-blocking agent, such as a paraffinic wax. The label also includes a support portion, the support portion including a carrier and a non-wax, non-silicone release layer positioned over the carrier and in direct contact with the protective lacquer layer and the periphery of the adhesive layer.

18 Claims, 2 Drawing Sheets

HEAT-TRANSFER LABEL INCLUDING NON-WAX RELEASE LAYER

BACKGROUND OF THE INVENTION

The present invention relates generally to heat-transfer labels and more particularly to heat-transfer labels that include a non-wax release layer.

Heat-transfer labels are commonly used in the decorating and/or labelling of commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One of the earliest types of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt. This enables the paper sheet to be released from the ink design layer, with a portion of the wax layer being transferred with the ink design layer onto the article and with a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

Many heat-transfer labels include, in addition to the layers described above, an adhesive layer (comprising, for example, a polyamide or polyester adhesive) deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, many heat-transfer labels additionally include a protective lacquer layer interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is caused by the presence of the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such approach to this problem is disclosed in U.S. Pat. No. 3,922,435, inventor Asnes, which issued Nov. 25, 1975, and which is incorporated herein by reference. In the aforementioned Asnes patent, which relates to a heat-transfer label for objects such as plastic bottles, the customary release layer of wax is replaced with a release layer of a non-wax resin. This non-wax resinous layer is referred to in the Asnes patent as a dry release since it does not transfer to the article along with the ink design layer and is said to comprise a thermoset polymeric resin, such as cross-linked resins selected from the group consisting of acrylic resins, polyamide resins, polyester resins, vinyl resins, epoxy resins, epoxy-acrylate resins, allyl resins, aldehyde resins, such as phenol-formaldehyde resins and the amino-aldehyde resins, e.g., urea formaldehyde or melamine formaldehyde, and combinations thereof.

The heat-transfer label of the foregoing Asnes patent also comprises a clear lacquer layer which is printed onto the release layer, a design print (which may include a number of ink layers) which is printed onto the clear lacquer layer, and a heat-activatable adhesive layer which is printed onto the design print and the clear lacquer layer. The Asnes patent explicitly teaches that "the design print and the adhesive print are both located marginally wholly within the lacquer print. The adhesive layer may be of the same area of larger in area than the design print so long as it is smaller in area than the lacquer print." The Asnes patent also teaches that "it is highly preferred that neither the release layer nor the lacquer layer, at least where they are in contact with each other, contain any substance which is oily or liquid at heat transfer temperature since the oil or liquid, like the wax in wax release layers, will part, leaving some on the lacquer surface and some on the removed release surface."

Another example of a heat-transfer label comprising a non-wax release layer is disclosed in U.S. Pat. No. 4,935,300, inventors Parker et al., which issued Jun. 19, 1990, and which is incorporated herein by reference. In the aforementioned Parker patent, the label, which is said to be particularly well-suited for use on high density polyethylene, polypropylene, polystyrene, polyvinylchloride and polyethylene terephthalate surfaces or containers, comprises a paper carrier web which is overcoated with a layer of thermoplastic polyethylene. A protective lacquer layer comprising a polyester resin and a relatively small amount of a nondrying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described Parker label substantially reduces the wax-related effects discussed previously, said label does not quite possess the same release characteristics of heat-transfer labels containing a wax release layer. In fact, when put to commercial use, the polyethylene release layer of the Parker label was found to become adhesive when subjected to the types of elevated temperatures typically encountered during label transfer. Accordingly, another type of heat-transfer label differs from the Parker heat-transfer label in that a very thin layer or "skim coat" of carnauba wax is interposed between the polyethylene release layer and the protective lacquer layer to improve the release of the protective lacquer from the polyethylene-coated carrier web. The thickness of the skim coat corresponds to approximately 0.1–0.4 lbs. of the wax spread onto about 3000 square feet of the polyethylene release layer. The aforementioned "skim coat-containing" heat-transfer label also differs from the Parker label in that the heat-activatable adhesive of the "skim coat" label is printed over the entirety of the ink and protective lacquer layers, with the peripheral edges of the adhesive layer in direct contact with the wax skim coat.

An example of a "skim coat-containing" heat-transfer label of the type described above is disclosed in U.S. Pat. No. 5,800,656, inventors Geurtsen et al., which issued Sep. 1, 1998, and which is incorporated herein by reference. According to one embodiment, the Geurtsen label is designed for use on silane-treated glass containers of the type that are subjected to pasteurization conditions, the label including a support portion, a skim coat positioned on top of the support portion and a transfer portion positioned on top of the support portion. The support portion includes a sheet of paper overcoated with a release layer of polyethylene. The transfer portion includes an organic solvent-soluble phenoxy resin protective lacquer layer, an organic solvent-soluble polyester resin ink layer over the protective lacquer layer, and a water-dispersible acrylic adhesive resin layer over the ink and protective lacquer layers and onto a surrounding portion of the skim coat.

Although the release properties of heat-transfer labels that include the aforementioned wax skim coat are much improved compared to similar heat-transfer labels lacking said wax skim coat, said labels do result in a portion of the wax skim coat being transferred to the article being decorated during label transfer. As a result, particularly when the labelled article is dark in color, a wax residue is often visible to the naked eye on the article around the peripheries of the label and in open-copy areas of the label. Such a wax residue, for the reasons discussed above, is undesirable from an aesthetic standpoint. In addition, said wax residue precludes the possibility of decorating articles, such as containers, with "wrap-around" labels of the type that completely encircle an object since the adhesive present at the trailing end of the label will not adhere to that portion of the article covered by the wax residue that is deposited with the leading end of the label.

Heat-transfer labels of the type that include the aforementioned wax skim coat are typically heated during the labelling process in order to cause the wax skim coat to soften, thereby facilitating label transfer. However, the heating temperatures needed to soften the wax skim coat have become increasingly more difficult to achieve as new decorating systems are being developed in which bottle through-put is higher and, consequently, the dwell time for heating is shorter, and the actual heating temperatures are lower.

Yet another example of a heat-transfer label comprising a non-wax release layer is disclosed in PCT Appln. No. PCT/US89/01731, inventors Abber et al., which was published Feb. 8, 1990, and which is incorporated herein by reference. In the aforementioned Abber PCT application, a heat-transfer label for application to a plastic bottle or container is described that includes a carrier sheet and a transferable substrate affixed to the carrier sheet. The carrier sheet includes a nonwax thermoset release layer coated over a paper sheet. The nonwax thermoset release layer is a noncellulosic alkyd resin formed by the crosslinking of an alkyd polymer with a methoxy melamine to produce a thermoset release. The alkyd polymer employed is preferably of the type formed by the thermosetting reaction product of a hydroxy-functional polyester with a drying oil. The transferable substrate affixed to the carrier sheet includes a nonwax lacquer transfer layer, an ink design layer over the lacquer transfer layer and a heat-activatable adhesive layer over the ink design layer.

Still another example of a heat-transfer label comprising a non-wax release layer is disclosed in PCT Appln. No. PCT/EP97/00642, inventors Ast, which was published on Aug. 14, 1997, and which is incorporated herein by reference. In the aforementioned Ast PCT application, the release layer is made of polypropylene or polyethylene.

Still yet another example of a heat-transfer label comprising a non-wax release layer is disclosed in European Patent Appln. No. 824,251, inventors Brandt et al., which was published on Feb. 18, 1998, and which is incorporated herein by reference. In the aforementioned Brandt EPO application, there is disclosed a heat-transfer label that is designed for use on a crate and that, once applied to a crate, can easily be removed therefrom in a washing process without the ink dissolving in the wash liquid. The foregoing Brandt label comprises a backing layer and a transfer layer, the transfer layer being releasably attached to the backing layer. The backing layer comprises a polypropylene film coated with a silicone layer. The transfer layer comprises a first containment layer in contact with the silicone layer, an ink layer on top of the first containment layer and marginally wholly within the first containment layer, a second containment layer on top of the ink layer and on top of the first containment layer, the first and second containment layers contacting one another outside the perimeter of the ink layer to form a closed envelope around the ink layer, and an adhesive layer on top of the first and second containment layers, the first containment layer and the adhesive layer contacting one another outside the perimeter of the second containment layer to form a closed envelope around the ink layer and second containment layer.

Unfortunately, the use of silicone as a release coating, as in the preceding example, presents certain problems or shortcomings. One of these problems is the difficulty of printing a label on a silicone release. Other possible problems or shortcomings are set forth in U.S. Pat. No. 5,314,929, inventors Crivello et al., which issued May 24, 1994, and which is incorporated herein by reference. In the aforementioned Crivello patent, there is disclosed a silicone-free release coating composition adapted for use with adhesive tapes, said silicone-free coating composition being said to be rapidly curable and comprising (a) between about 50 and about 95 wt % of an alkyl vinyl ether monomer having the formula $C_nH_{2n+1}O—CH—CH_2$ wherein n has a value of from 8 to 20, optionally containing a cationically polymerizable comonomer; (b) between about 5 and about 50 wt % of a multifunctional vinyl ether monomer and (c) between about 0.1 and about 10 wt % of an onium salt photoinitiator.

It is to be noted that the aforementioned Crivello patent neither teaches nor suggests the use of its release composition as a release coating in a heat-transfer label.

Other documents of interest include European Patent Application No. 819,726, published Jan. 21, 1998, which is incorporated herein by reference.

SUMMARY OF THE INVENTION

It is an object of the present invention to provide a heat-transfer label that includes a novel release layer.

It is another object of the present invention to provide a heat-transfer label as described above whose release layer overcomes at least some of the problems associated with many of the heat-transfer label release layers described above.

It is still another object of the present invention to provide a heat-transfer label as described above whose release layer does not transfer, to any discernible degree observable to the naked eye, with the transfer portion of the label onto the article that is being labelled.

In furtherance of the above and other objects to be set forth or to become apparent from the description to follow, and according to one aspect of the invention, there is provided a heat-transfer label, said heat-transfer label comprising:

(a) a transfer portion, said transfer portion comprising
   (i) a protective lacquer layer,
   (ii) an ink design layer over said protective lacquer layer, and
   (iii) a heat-activatable adhesive layer over said ink design and protective lacquer layers, said heat-activatable adhesive layer extending beyond the peripheries of said ink design and protective lacquer layers; and (b) a support portion, said transfer portion being positioned over said support portion for transfer of the transfer portion from the support portion to an article under conditions of heat and pressure, said support portion comprising
   (i) a carrier, and
   (ii) a release layer positioned over said carrier, said release layer being made of a non-wax, non-silicone, thermoset release material, said release layer separating cleanly from said transfer portion with no visually discernible portion of said release layer being transferred to the article along with said transfer portion.

Preferably, the release layer of the aforementioned support portion is in direct contact with the transfer portion; more preferably, the release layer is in direct contact with each of the protective lacquer layer and the periphery of the heat-activatable adhesive layer of the label.

The foregoing release layer is preferably made by (a) coating onto the carrier a release composition comprising (i) a functionalized alkyl monomer having a carbon chain length of at least 18 carbon atoms, (ii) a crosslinking monomer reactive with said functionalized alkyl monomer, and (iii) an initiator for effecting at least a partial cure between said functionalized alkyl monomer and said crosslinking monomer and (b) activating said initiator.

The above-mentioned functionalized alkyl monomer is preferably an alkyl vinyl ether monomer, more preferably an alkyl vinyl ether monomer of the formula $C_nH_{2n+1}O—CH═CH$ wherein n is no less than 18 and no greater than 30, n even more preferably being equal to 18. The above-mentioned crosslinking monomer preferably comprises at least one multifunctional acrylate monomer and more preferably comprises a trifunctional acrylate monomer and a difunctional acrylate monomer. The above-mentioned free-radical initiator is preferably a free-radical photoinitiator, more preferably a free-radical UV photoinitiator.

Preferably, the foregoing release composition comprises about 5 to 30 wt % (more preferably about 10 to 20 wt %) of said alkyl vinyl ether monomer, about 40 to 80 wt % (more preferably 60 to 70 wt %) of said difunctional acrylate monomer, about 5 to 50 wt % (more preferably 10 to 30 wt %) of said trifunctional acrylate monomer and about 2 to 8 wt % (more preferably 3 to 6 wt %) of said free-radical initiator. The composition may further include a wetting agent in an amount constituting about 0.1 to 1.0 wt % of said composition, said wetting agent preferably being selected from the group consisting of fluoroalkyl surfactants, silicone polyether wetting agents, and silicone defoamers.

Preferably, the carrier of the above-described heat-transfer label is a plastic film; more preferably, said carrier is a transparent polyester film.

The heat-activatable adhesive layer of the foregoing heat-transfer label preferably comprises a polyester resin and more preferably additionally comprises an anti-blocking agent, such as a paraffinic wax. Said paraffinic wax is preferably present in the adhesive composition used to make said adhesive layer in an amount constituting about 1 wt % of said adhesive composition. The protective lacquer layer of the foregoing heat-transfer label preferably comprises a phenoxy resin, more preferably a cross-linked phenoxy resin. The ink design layer of the foregoing heat-transfer label preferably comprises a polyester resin.

According to another aspect of the invention, a heat-transfer label is provided, said heat-transfer label comprising:

(a) a transfer portion, said transfer portion comprising
   (i) an ink design layer, and
   (ii) a heat-activatable adhesive layer over said ink design layer; and (b) a support portion, said transfer portion being positioned over said support portion for transfer of the transfer portion from the support portion to an article under conditions of heat and pressure, said support portion comprising
   (i) a carrier, and
   (ii) a release layer positioned over said carrier, said release layer being made of a non-wax, non-silicone, thermoset release material, said release layer separating cleanly from said transfer portion with no visually discernible portion of said release layer being transferred to the article along with said transfer portion, said release layer being made by (a) coating onto said carrier a release composition comprising (i) a functionalized alkyl monomer having a carbon chain length of at least 18 carbon atoms, (ii) a crosslinking monomer reactive with said functionalized alkyl monomer, and (iii) an initiator for effecting at least a partial cure between said functionalized alkyl monomer and said crosslinking monomer and (b) activating said initiator.

Preferably, the transfer portion further comprises a protective lacquer layer, said ink design layer being positioned over said protective lacquer layer, said heat-activatable adhesive layer extending beyond the periphery of said protective lacquer layer. The release layer of the aforementioned support portion is preferably in direct contact with the transfer portion thereof, more preferably, the release layer is in direct contact with each of the protective lacquer layer and the periphery of the heat-activatable adhesive layer.

The above-mentioned functionalized alkyl monomer is preferably an alkyl vinyl ether monomer, more preferably an alkyl vinyl ether monomer of the formula $C_nH_{2n+1}O—CH═CH$ wherein n is no less than 18 and no greater than 30, n even more preferably being equal to 18. The above-mentioned crosslinking monomer preferably comprises at least one multifunctional acrylate monomer and more preferably comprises a trifunctional acrylate monomer and a difunctional acrylate monomer. The above-mentioned initiator is preferably a free-radical initiator, more preferably a free-radical photoinitiator, even more preferably a free-radical UV photoinitiator.

Preferably, the foregoing release composition comprises about 5 to 30 wt % (more preferably about 10 to 20 wt %) of said alkyl vinyl ether monomer, about 40 to 80 wt % (more preferably 60 to 70 wt %) of said difunctional acrylate monomer, about 5 to 50 wt % (more preferably 10 to 30 wt %) of said trifunctional acrylate monomer and about 2 to 8 wt % (more preferably 3 to 6 wt %) of said free-radical initiator. The composition may further include a wetting agent in an amount constituting about 0.1 to 1.0 wt % of said composition, said wetting agent preferably being selected from the group consisting of fluoroalkyl surfactants, silicone polyether wetting agents, and silicone defoamers.

Preferably, the carrier of the above-described heat-transfer label is a plastic film; more preferably, said carrier is a transparent polyester film.

The heat-activatable adhesive layer of the foregoing heat-transfer label preferably comprises a polyester resin and more preferably additionally comprises an anti-blocking agent, such as a paraffinic wax. The protective lacquer layer of the foregoing heat-transfer label preferably comprises a phenoxy resin, more preferably a cross-linked phenoxy resin. The ink design layer of the foregoing heat-transfer label preferably comprises a polyester resin.

The present invention is also directed to a method of decorating a glass article, such as a clear glass container, said method comprising the steps of:

- (a) providing a heat-transfer label, said heat-transfer label comprising:
  - (i) a transfer portion, said transfer portion comprising
    - (A) an ink design layer, and
    - (B) a heat-activatable adhesive layer over said ink design layer, and
  - (ii) a support portion, said transfer portion being positioned over said support portion for transfer of the transfer portion from the support portion to a glass article under conditions of heat and pressure, said support portion comprising
    - (A) a carrier, and
    - (B) a release layer positioned over said carrier, said release layer being made of a non-wax, non-silicone, thermoset release material, said release layer separating cleanly from said transfer portion with no visually discernible portion of said release layer being transferred to the glass article along with said transfer portion; and
- (b) transferring said transfer portion from said support portion onto the glass article.

The present invention is additionally directed to a release coating composition, said release coating composition comprising:

- (a) an alkyl vinyl ether monomer having a carbon chain length of at least 18 carbon atoms;
- (b) a crosslinker reactive with said alkyl vinyl ether monomer, said crosslinker comprising at least one multifunctional acrylate monomer reactive with said alkyl vinyl ether monomer; and
- (c) an initiator for effecting at least a partial cure between said alkyl vinyl ether monomer and said crosslinker.

The alkyl vinyl ether monomer of the aforementioned release coating composition preferably has a carbon chain length of no greater than 30 carbon atoms and more preferably has a carbon chain length of 18 carbon atoms. The crosslinker of the aforementioned release coating composition preferably comprises a difunctional acrylate monomer and a trifunctional acrylate monomer. The initiator of the aforementioned release coating composition is preferably a free-radical initiator, more preferably a free-radical photoinitiator and even more preferably a free-radical UV photoinitiator.

Preferably, said composition comprises about 5 to 30 wt % of said alkyl vinyl ether monomer, about 40 to 80 wt % of said difunctional acrylate monomer, about 5 to 50 wt % of said trifunctional acrylate monomer and about 2 to 8 wt % of said free-radical UV photoinitiator. Said composition may further comprise a wetting agent, such as a fluoroalkyl surfactant, a silicone polyether wetting agent or a silicone defoamer, in an amount constituting about 0.1 to 1.0 wt % of said composition.

The present invention is further directed to a method of forming a release coating on a substrate, said method comprising the steps of (a) coating the substrate with the above-described release coating composition and (b) activating said free-radical initiator until said release coating composition is sufficiently cured so as to form a release coating on the substrate.

The present invention is still further directed to a release coating prepared according to the aforementioned method.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
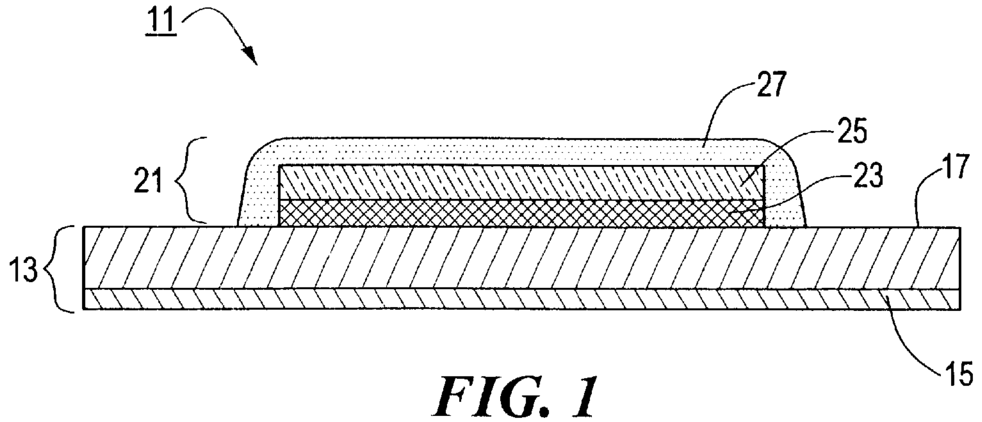
FIG. 1 is a schematic section view of one embodiment of a heat-transfer label constructed according to the teachings of the present invention.

Referring now to FIG. 1, there is shown a schematic section view of one embodiment of a heat-transfer label constructed according to the teachings of the present invention, said heat-transfer label being represented generally by reference numeral 11.

Label 11 comprises a support portion 13. Support portion 13, in turn, comprises a carrier 15. Carrier 15 may comprise any suitable material conventionally used as a carrier in heat-transfer labels, such as any of the carrier materials described in U.S. Pat. No. 3,922,435. For example, carrier 15 may be a plastic film or paper. Preferably, carrier 15 is a plastic film as plastic films are generally more durable than paper carriers and are comparable in terms of manufacturing costs. In addition, certain plastic films are sufficiently extensible to enable the selective stretching of various regions of a single label for application to a tapered or conical article (see U.S. Pat. Nos. 5,709,770 and 5,735,996, both of which are incorporated herein by reference, for examples of labels that are stretched in selected areas for application to tapered articles).

More preferably, carrier 15 is a clear plastic film. As can readily be appreciated, one benefit to using a clear material as carrier 15 is that, if desired, one can inspect the quality of the printed matter of the label by looking at said printed matter through carrier 15 (from which perspective said printed matter appears as it will on the labelled article), as opposed to looking at said printed matter through the adhesive layer of the label (from which perspective said printed matter appears as the mirror image of what will appear on the labelled article).

A particularly preferred plastic material for use as carrier 15 is a clear polyester film, such as a clear polyethylene terephthalate (PET) film. This is because, at least as compared to some other plastic materials like polyethylene and polypropylene, polyester is a strong plastic material and makes a good substrate to be printed onto. In addition, unlike polyethylene, polyester does not tend to soften and become tacky at the types of temperatures typically encountered during heat-transfer. Examples of suitable polyester films for use in the present invention include the S10 brand 1.5 mil polyester film commercially available from Toray and the SM30 brand 1.5 mil polyester film commercially available from SKC America.

Support 13 also includes a release layer 17 overcoated onto carrier 15. Release layer 17 is a thermoset release material that separates cleanly from the below-described transfer portion of label 11 and is not transferred, to any visually discernible degree, with said transfer portion of label 11 onto an article being labelled. (For purposes of the present specification and claims, the term "visually discernible" is to be construed in terms of an unaided or naked human eye.)

Release layer 17 does not contain any waxes or any silicones, except to the limited extent provided below, and the terms "non-wax" and "non-silicone," when used in the present specification and claims to describe and to define the release layer, are defined herein to exclude from the release layer the presence of any and all waxes and silicones not encompassed by the limited exceptions provided below.

Release layer 17 is preferably made by (a) coating onto carrier 15 a composition comprising (i) a functionalized alkyl monomer having a carbon chain length of at least 18 carbon atoms, (ii) a crosslinking monomer reactive with said functionalized alkyl monomer, and (iii) an initiator for effecting at least a partial cure between said functionalized alkyl monomer and said crosslinking monomer and (b) activating said initiator.

The functionalized alkyl monomer of the aforementioned composition is preferably an alkyl vinyl ether monomer having a carbon chain length of at least 18 carbon atoms. More preferably, said alkyl vinyl ether monomer is $C_nH_{2n+1}O—CH═CH$ wherein n is at least 18 and no greater than 30. A particularly preferred alkyl vinyl ether monomer is octadecyl vinyl ether, which is commercially available as RAPI-CURE® ODVE from ISP Technologies Inc. (Wayne, N.J.). The foregoing alkyl vinyl ether monomer is preferably present in said composition in an amount constituting about 5 to 30 wt %, more preferably 10 to 20 wt %, of said composition.

An example of another type of functionalized alkyl monomer suitable for use in the present invention is an epoxidized alpha olefin having a carbon chain length of at least 18 carbon atoms, such as VIKOLOX® 24–28 epoxidized alpha olefin, which is commercially available from Elf Atochem North America, Inc. (Minneapolis, Minn.). Still another type of functionalized alkyl monomer suitable for use in the present invention is an alkyl acrylate having a carbon chain length of at least 18 carbon atoms.

Where the functionalized alkyl monomer of the above-described composition is an alkyl vinyl ether monomer, the crosslinking monomer of the above-described composition preferably is at least one multifunctional acrylate monomer and more preferably is a mixture of a difunctional acrylate monomer and a trifunctional acrylate monomer. (Where the functionalized alkyl monomer is an epoxidized alpha olefin, the crosslinking monomer is preferably an epoxy, and where the functionalized alkyl monomer is an alkyl acrylate, the crosslinking monomer is preferably an acrylate.) The aforementioned mixture of both difunctional and trifunctional acrylate monomers is believed to work better than either acrylate monomer individually as the difunctional acrylate monomer tends to be less polar than the trifunctional acrylate and, therefore, releases better from the heat-activatable adhesive layer of the transfer portion to be described below whereas the trifunctional acrylate monomer tends to form a more extensive network of bonds throughout the layer than does the difunctional acrylate monomer and, therefore, tends to endow the release layer with an improved degree of chemical resistance and hold-out of layers deposited thereonto.

In general, the difunctional and trifunctional acrylate monomers are preferably as non-polar as possible. Propoxylated or methacrylate monomers and oligomers may be particularly well-suited for use in the present invention, as may difunctional oligomers with hydrocarbon backbones, such as 1,6-hexane diol diacrylate. An example of a suitable difunctional acrylate monomer for use in the present invention is propoxylated neopentyl glycol diacrylate, which is commercially available from Sartomer Company as SR-9003 propoxylated neopentyl glycol diacrylate. An example of a suitable trifunctional acrylate monomer for use in the present invention is propoxylated trimethylolpropane triacrylate, which is commercially available from Sartomer Company as SR-492 three mole propoxylated TMPTA. The foregoing difunctional acrylate monomer is preferably present in said composition in an amount constituting about 40 to 80 wt %, more preferably about 60 to 70 wt %, of said composition, and the foregoing trifunctional acrylate monomer is preferably present in said composition in an amount constituting about 5 to 50 wt %, more preferably about 10 to 30 wt %, of said composition.

The free-radical initiator of the foregoing composition preferably is a free-radical photoinitiator and more preferably is a free-radical UV photoinitiator. An example of a suitable free-radical initiator for use in the present invention is Irgacure® 500 free-radical UV photoinitiator, a commercially available product from CIBA-GEIGY that comprises a mixture of two photoinitiators, 1-hydroxycyclohexyl phenyl ketone and benzophenone. The foregoing free-radical UV photoinitiator is preferably present in said composition in an amount constituting about 2 to 8 wt %, more preferably about 3 to 6 wt %, of said composition.

The foregoing release composition may also include a very small amount of a wetting agent to improve the lay-down of the release composition onto carrier 15 and to improve printing of the transfer portion of the label onto release layer 17. Examples of suitable wetting agents include fluoroalkyl surfactants, silicone polyether wetting agents, and silicone defoamers, said wetting agents being added to the release composition in an amount constituting about 0.1 to 1.0 wt % of said composition.

To form release layer 17, the above-described composition is deposited onto carrier 15, preferably to a coat weight of at least about 1.0 gram/meter$^2$. The deposited composition is then UV cured for a number of seconds or minutes. This may be done, for example, using a Fusion benchtop model curing unit using one Fusion "H" bulb at 55% power and belt speed of 125 fpm. Nitrogen inerting may also be used to displace oxygen to roughly 120 ppm or less of oxygen.

Although not wishing to be limited to any theory behind the invention, the present inventors believe that, in those instances in which the subject composition includes the aforementioned alkyl vinyl ether monomer, difunctional acrylate monomer, and trifunctional acrylate monomer, the cured product is a partially-cured release coating, with a portion of the alkyl vinyl ether monomer bonded to the difunctional acrylate monomer and/or the trifunctional acrylate monomer and a portion of the alkyl vinyl ether monomer not bonded to either of the difunctional acrylate monomer or the trifunctional acrylate monomer. The present inventors believe that the presence of some unbonded alkyl vinyl ether monomer in the release coating may be beneficial in endowing the release coating with its release properties.

Although release layer 17 is particularly well-suited for use as a release coating in a heat-transfer label, release layer 17 may also be useful as a release coating for metal sheets in foil stamping techniques and as a release coating for certain pressure sensitive adhesives and adhesive tapes, such as Scotch brand adhesive tape #810.

Label 11 further comprises a transfer portion 21 (it being understood that a plurality of transfer portions 21 may be spaced apart on a single support portion 13). Transfer portion 21, in turn, includes (i) a protective lacquer layer 23 printed directly on top of a desired area of release layer 17, (ii) an ink design layer 25 printed directly onto a desired area of lacquer layer 23, and (iii) a heat-activatable adhesive layer 27 printed directly onto ink design layer 25, any exposed portions of lacquer layer 23 and a surrounding area of release layer 17.

Where the article being labelled is a glass article, such as a silane-treated glass container, protective lacquer layer 23 preferably is a phenoxy protective lacquer layer, such as that described in U.S. Pat. No. 5,800,656, or is a cross-linked phenoxy lacquer layer such as that disclosed in U.S. patent application Ser. No. 09/093,150, which is incorporated herein by reference. This is because phenoxy protective lacquer layers tend to possess the high degree of scuff resistance and chemical resistance preferred for glass articles. It should be understood, however, that release layer 17 releases well from a variety of protective lacquer layers of different compositions and that other types of protective lacquer resins may also be suitable for use in layer 23 depending upon the type of article being labelled and the use to which the decorated article is to be put.

Examples of phenoxy lacquer resins suitable for use in the aforementioned phenoxy or cross-linked phenoxy protective lacquer layer include the UCAR® Phenoxy Resins (Phenoxy Associates, Rock Hill, S.C.), which have the following chemical structure:

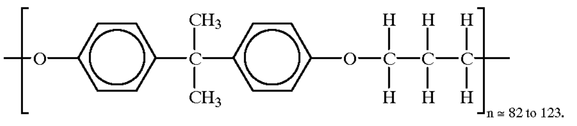

A particularly preferred UCAR® Phenoxy Resin is PKHH, a medium weight grade of the above structure which, at 40% solids, by weight, in methyl ethyl ketone (MEK), has a solution viscosity of 4500 to 7000 mPa·s(cP). Examples of a suitable cross-linker for cross-linking the aforementioned phenoxy resin include partially methylated melamine-formaldehyde resins of the type present in the CYMEL 300 series of partially methylated melamine-formaldehyde resin solutions (Cytec, Industries, Inc., West Paterson, N.J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of lacquer layer 23 (with the remainder of lacquer layer 23 being the aforementioned phenoxy resin) since amounts of CYMEL 370 in excess thereof may cause lacquer layer 23 to become tacky.

To form a cross-linked phenoxy lacquer layer 23, a lacquer composition comprising the above-identified phenoxy lacquer resin, a suitable cross-linker and one or more suitable volatile solvents are deposited onto a desired area of release layer 17, preferably by gravure printing or a similar technique. After deposition of the lacquer composition onto the desired area of layer 17, the volatile solvent(s) evaporate (s), leaving only the non-volatile components thereof to make up lacquer layer 23. In a preferred embodiment, the lacquer composition comprises about 20%, by weight, PKHH; about 1%, by weight, CYMEL 370 resin solution; about 59%, by weight, methyl ethyl ketone; and about 20%, by weight, toluene.

Ink design layer 25 of transfer portion 21, which layer may actually comprise either a single ink layer or a plurality of ink layers, may be made using one or more conventional inks, such as polyester inks, polyester/vinyl inks, polyamide inks and/or acrylic inks, as well as the phenoxy ink described in commonly-assigned, co-pending U.S. Ser. No. 09/204,424, which is incorporated herein by reference. Such inks typically comprise a resin of the type described above, a suitable pigment or dye, and one or more suitable volatile solvents. Ink design layer 25 is formed in the conventional manner by depositing, preferably by gravure printing, one or more ink compositions of the type described above onto one or more desired areas of lacquer layer 23 and, thereafter, allowing the volatile solvent(s) of the ink composition(s) to evaporate, leaving only the non-volatile ink components to form layer 25.

An example of polyester ink suitable for use in forming layer 25 comprises 18 wt % ViTEL® 2700 (a copolyester resin commercially available from Bostik, Middleton, Mass., having a high tensile strength (7000 psi) and a low elongation (4% elongation)), 6 wt % pigment, 30.4 wt % n-propyl acetate and 45.6 wt % toluene. An example of another suitable polyester ink comprises ViTEL® 2300 polyester resin (a copolyester resin also commercially available from Bostik having a high tensile strength (8000 psi) and a low elongation (7% elongation)).

In those instances in which release layer 17 is formed using the above-described composition comprising an alkyl vinyl ether monomer, a difunctional acrylate monomer and a trifunctional acrylate monomer, adhesive layer 27 of transfer portion 21 preferably comprises a polyester-based adhesive; however, it is to be understood that other types of adhesive materials may also be suitable for use as layer 27 depending upon their release from release layer 17 (the periphery of adhesive layer 27 being in direct contact with release layer 17). Adhesive layer 27 is preferably formed by depositing, by gravure printing or the like, onto (i) ink layer 25, (ii) exposed portions of lacquer layer 23 and (iii) a surrounding area of release layer 17 an adhesive composition comprising an adhesive resin and one or more volatile solvents and then evaporating the volatile component(s) of the composition (for example, by oven-heating for 30 seconds at 200° F.), leaving only the non-volatile solid component(s) thereof to form layer 27.

An example of a suitable polyester-based adhesive composition for use in forming a polyester-based adhesive of the type mentioned above comprises about 10.7 wt % of ViTEL® 2700 polyester resin, about 10.7 wt % of ViTEL® 2300, about 1.1 wt % of BENZOFLEX® S404 glyceryl tribenzoate plasticizer (commercially available from Velsicol Chemical Corporation, Chicago, Ill.), about 1.1 wt % HULS 512 adhesion promoter (commercially available from Sivento Inc., Piscataway, N.J.), about 19.20 wt % toluene and about 57.10 wt % methyl ethyl ketone.

Adhesive layer 27 may additionally include an anti-blocking agent for use in preventing adhesive layer 27 from adhering to the underside of carrier 15 when a label assembly comprising a plurality of transfer portions 21 on a single support portion 13 is wound into a roll. The inclusion of said anti-blocking agent in said adhesive may be particularly desirable in those instances in which adhesive layer 27 and carrier 15 have a high degree of adherence to one another, such as where adhesive layer 27 comprises a polyester-based adhesive and carrier 15 is a polyester film. An example of a suitable anti-blocking agent is a wax, such as a paraffinic wax, which is added to the adhesive composition used to form adhesive layer 27 in an amount constituting about 1 wt % of said composition.

Figure 2:
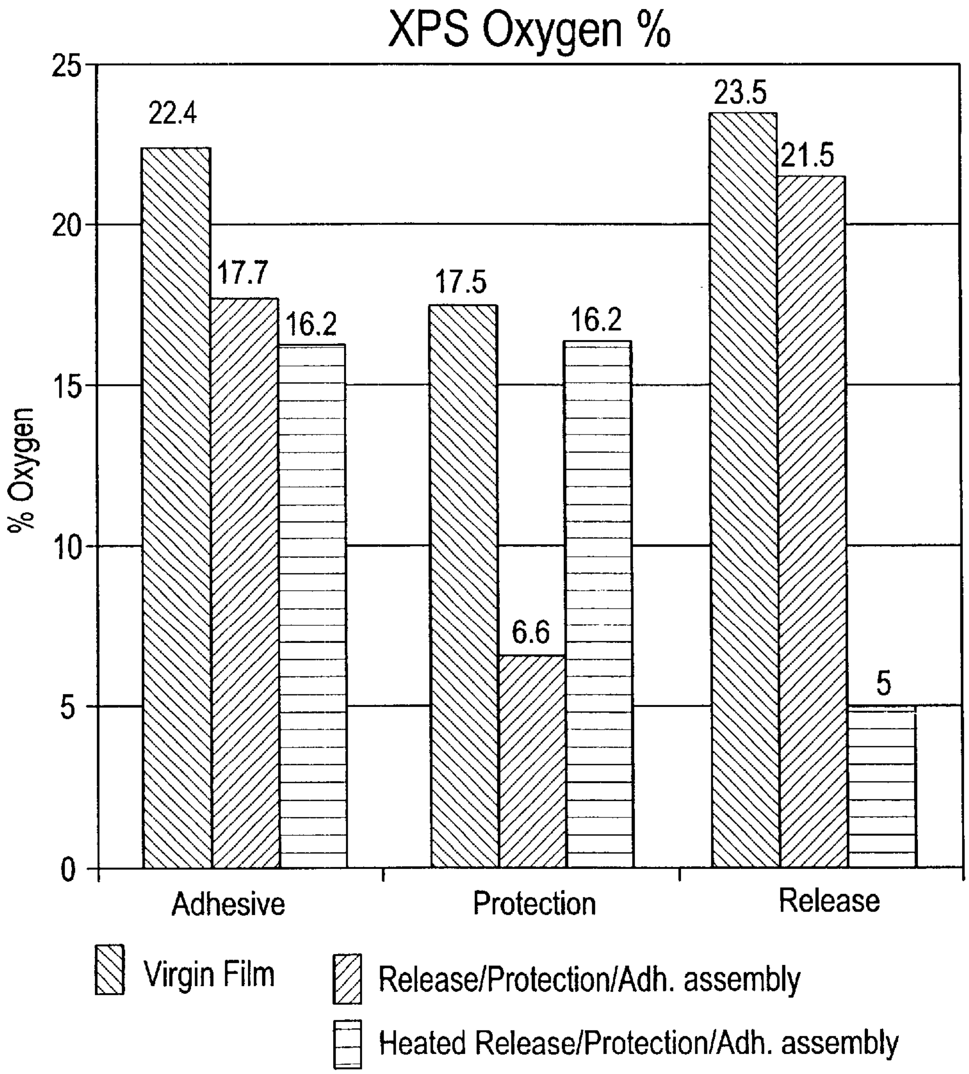
FIG. 2 is a graph depicting the surface oxygen content as measured by X-ray phosphorescent spectroscopy (XPS) of each layer of a three-layer label assembly, before and after heating of the assembly at 110° C. for 20 minutes, said assembly being made up of an alkyl vinyl ether/acrylate release layer, a cross-linked phenoxy protective lacquer positioned on top of said release layer, and a polyester with wax adhesive layer positioned on top of said protective lacquer layer, said graph also depicting the surface oxygen content as measured by XPS of each layer apart from said assembly.

In those instances in which a wax is included in adhesive layer 27, a percentage of said wax is believed to migrate to other layers of label 11, including to the interface between release layer 17 and protective lacquer layer 23. Evidence of said migration can be seen in FIG. 2, where the oxygen content at the surface of various layers of a three-layer label assembly was measured by XPS, said assembly being made up of the above-described alkyl vinyl ether/acrylate release layer, the above-described cross-linked phenoxy protective lacquer positioned on top of said release layer and the above-described polyester with wax adhesive layer positioned on top of said phenoxy protective lacquer layer.

Figure 3:
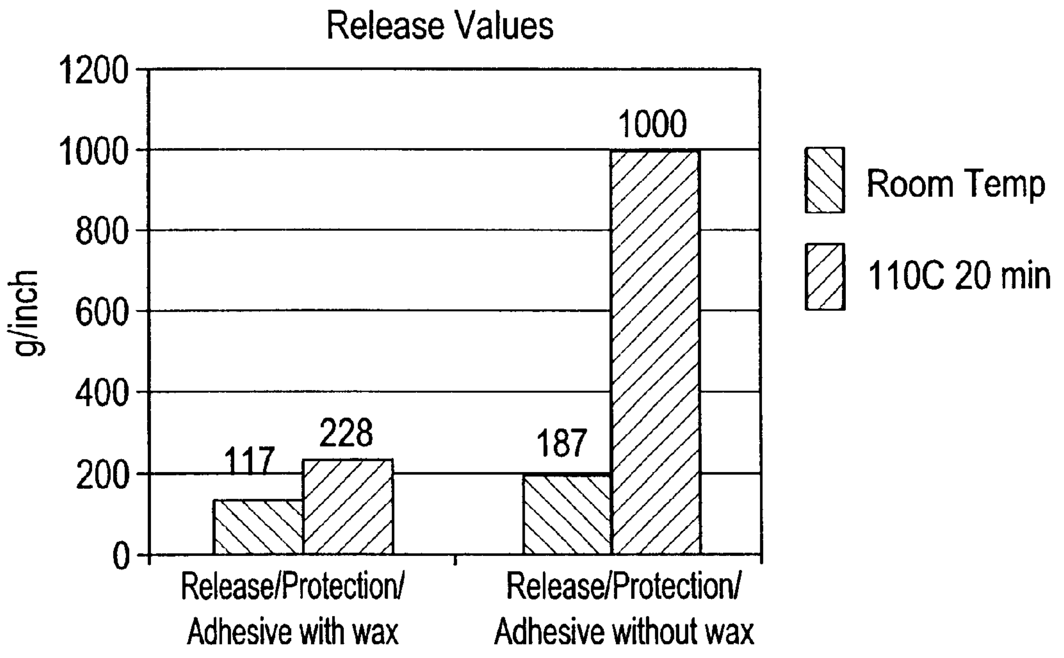
FIG. 3 is a graph depicting the release values, before and after heating at 110° C. for 20 minutes, of the three-layer assembly of FIG. 2 and of another three-layer assembly differing from that of FIG. 2 in that no wax is present in the adhesive layer thereof.

Moreover, as seen in FIG. 3, said wax migration appears to improve the release of protective lacquer layer 23 and adhesive layer 27 from release layer 17. Nevertheless, notwithstanding the presence of said minute quantities of wax at the surface of release layer 17, the present inventors did not detect any visually discernible amount of wax that was transferred from the release layer to the labelled article. Any such quantities of migrated wax do not render a release layer of the present invention outside the meaning of the term "non-wax."

Label 11 may be used in the conventional manner by contacting adhesive layer 27 with a desired article, such as a pre-heated, silane-treated clear glass container, while applying sufficient heat to the bottom of carrier 15 (about 300 to 450° F.) so as to cause transfer portion 21 to be released from support portion 13 and so as to cause adhesive layer 27 to become heat-activated for bonding to the desired article. Heat-transfer may alternatively be effected by directly heating or pre-heating the container only (so as to activate the heat-activatable adhesive placed in contact with the heated container) and not by directly heating the heat-transfer label itself.

The present inventors have noted that, when label 11 is used to decorate silane-treated, clear glass containers, a good degree of label adherence and scuff resistance is achieved (i.e., at least about 5H pencil hardness, as measured by ASTM standard D3363-92a for film hardness on a substrate).

One of the advantages associated with the use of a release layer like release layer 17 is that transfer portion 21 of label 11 can be of the "wrap-around" variety that completely encircles a container.

The present invention may more clearly be understood by reference to the following examples, it being understood that such examples are illustrative and not to be considered as limiting of the invention.

EXAMPLE 1

A release formulation of the following composition was manually coated onto a 1.5 mil polyester film to a coat weight of about 1.0 gram/meter$^2$:

| Component | Amount (% by weight) |
|---|---|
| Sartomer Company SR90003 Propoxylated Neopentyl Glycol Diacrylate | 60% |
| Sartomer Company SR492 Propoxylated Trimethylolpropane Triacrylate | 21% |
| BASF Corp. ODVE octadecyl vinyl ether | 15% |
| Ciba-Geigy Irgacure 500 free-radical photoinitiator | 3.9% |
| 3M FC430 non-ionic fluorochemical surfactant | 0.1% |

The coating was then cured with a Fusion benchtop model curing using one Fusion "H" bulb at 55% power and belt speed of 125 fpm. Nitrogen inerting was used to displace oxygen to roughly 120 ppm or less of oxygen. A transfer portion comprising a cross-linked phenoxy protective lacquer, a polyester ink and a polyester with wax adhesive as described above was printed onto the foregoing coated polyester film in the conventional manner. The thus-assembled label was then transferred onto a 275° F. glass bottle using a 180° F. platen. The decorated bottle was then visually inspected for the quality of the release and rated a "2" on a scale from "1" through "5," with "1" being the best.

EXAMPLE 2

The procedure of Example 1 was repeated, except that the release composition was coated onto a 1.5 mil polyester film using a 7-roll coating machine applying roughly 1.0 gram/m$^2$ at a speed of 600 fpm and the coating was then cured with two banks of Fusion "H" bulbs, with nitrogen inerting to less than 50 ppm. The decorated bottle was again rated a "2."

EXAMPLE 3

The procedure of Example 1 was repeated, except that the following release composition was used:

| Component | Amount (% by weight) |
|---|---|
| Sartomer Company SR90003 Propoxylated Neopentyl Glycol Diacrylate | 60% |
| Sartomer Company SR492 Propoxylated Trimethylolpropane Triacrylate | 21% |
| BASF Corp. ODVE octadecyl vinyl ether | 15% |
| Ciba-Geigy Irgacure 500 free-radical photoinitiator | 3.9% |
| Byk-Chemie BYK-080 polysiloxane copolymer | 0.1% |

The decorated bottle was rated a "2 to 3."

EXAMPLE 4

The procedure of Example 1 was repeated, except that the following release composition was used:

| Component | Amount (% by weight) |
|---|---|
| Sartomer Company SR90003 Propoxylated Neopentyl Glycol Diacrylate | 77.5% |
| Sartomer Company SR492 Propoxylated Trimethylolpropane Triacrylate | 7.5% |
| BASF Corp. ODVE octadecyl vinyl ether | 10% |
| Ciba-Geigy Irgacure 500 free-radical photoinitiator | 4% |
| Goldschmidt RC726 silicone release agent, acrylate modified | 1% |

The decorated bottle was rated a "2," but there was severe dewetting of the ink layer (presumably due to the presence of silicone in the release layer).

EXAMPLE 5

The procedure of Example 1 was repeated, except that the following release composition was used:

| Component | Amount (% by weight) |
|---|---|
| Sartomer Company SR90003 Propoxylated Neopentyl Glycol Diacrylate | 78% |
| Sartomer Company SR492 Propoxylated Trimethylolpropane Triacrylate | 8% |
| BASF Corp. ODVE octadecyl vinyl ether | 10% |
| Ciba-Geigy Irgacure 500 free-radical photoinitiator | 4% |

-continued

The decorated bottle was not rated numerically but was reported to have exhibited a good release, without dewetting of the ink layer.

EXAMPLE 6

The procedure of Example 1 was repeated, except that the following release composition was used:

| Component | Amount (% by weight) |
|---|---|
| Allied Signal VE 4020 Pentanedioic acid, bis [4-[(ethenyloxy)methyl]cyclohexyl]methylester | 74% |
| BASF Corp. ODVE octadecyl vinyl ether | 20% |
| Union Carbide UVI-6974 onium salt initiator - photoacid | 6% |

This release composition is an all-vinyl ether release system. Initially, the decorated bottle was rated a "2", but with post-baking at 230° F. for 20 minutes to simulate adhesive blocking of the type that might be caused by storing the label in a truck at 140° F. in the summer, the bottle was later re-rated a "4 to 5."

EXAMPLE 7

The procedure of Example 1 was repeated, except that the following release composition was used:

| Component | Amount (parts) |
|---|---|
| Lord Photoglaze T038 (a di- and tri-acrylate system with Irgacure 500 photoinitiator) | 100 parts |
| BASF Corp. ODVE octadecyl vinyl ether | 20 parts |

The decorated bottle was not rated numerically but was reported to have exhibited a good release.

EXAMPLE 8

The procedure of Example 1 was repeated, except that the following release composition was used:

| Component | Amount (parts) |
|---|---|
| Lord Photoglaze T038 (a di- and tri-acrylate system with Irgacure 500 photoinitiator) | 100 parts |
| BASF Corp. ODVE octadecyl vinyl ether | 40 parts |

The decorated bottle was not rated numerically but was reported to have exhibited a very poor release. In addition, solvent in the adhesive caused a discoloration in the release film. The release formulation of this example contains approximately 40 wt % ODVE alkyl vinyl ether, as compared to the approximately 20 wt % ODVE alkyl vinyl ether of Example 7.

EXAMPLE 9

The procedure of Example 1 was repeated, except that the following release composition was used:

| Component | Amount (% by weight) |
|---|---|
| Sartomer Company SR90003 Propoxylated Neopentyl Glycol Diacrylate | 80% |
| Sartomer Company SR492 Propoxylated Trimethylolpropane Triacrylate | 16% |
| BASF Corp. ODVE octadecyl vinyl ether | 0% |
| Ciba-Geigy Irgacure 500 free-radical photoinitiator | 4% |

The above formula has no octadecyl vinyl ether and is comparatively low in triacrylate. The decorated bottle was rated a "3 to 4," which was considered a poor release.

EXAMPLE 10

The procedure of Example 1 was repeated, except that the following release composition was used:

| Component | Amount (% by weight) |
|---|---|
| Sartomer Company SR90003 Propoxylated Neopentyl Glycol Diacrylate | 80% |
| Sartomer Company SR492 Propoxylated Trimethylolpropane Triacrylate | 0% |
| BASF Corp. ODVE octadecyl vinyl ether | 16% |
| Ciba-Geigy Irgacure 500 free-radical photoinitiator | 4% |

The above formula has no triacrylate. The decorated bottle was rated a "3," which was considered better than that for Example 9 but still not a very good release.

EXAMPLE 11

The procedure of Example 1 was repeated, except that the following release composition was used:

| Component | Amount (% by weight) |
|---|---|
| Sartomer Company SR90003 Propoxylated Neopentyl Glycol Diacrylate | 0% |
| Sartomer Company SR492 Propoxylated Trimethylolpropane Triacrylate | 80% |
| BASF Corp. ODVE octadecyl vinyl ether | 16% |
| Ciba-Geigy Irgacure 500 free-radical photoinitiator | 4% |

The above formula has no diacrylate. The decorated bottle was rated a "3 to 4," which was considered a poor release.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label comprising:

(a) a transfer portion, said transfer portion comprising
  (i) a protective lacquer layer,
  (ii) an ink design layer over said protective lacquer layer, and
  (iii) a heat-activatable adhesive layer over said ink design and protective lacquer layers, said heat-activatable adhesive layer extending beyond the peripheries of said ink design and protective lacquer layers, said heat-activatable adhesive layer comprising a polyester resin and a wax; and (b) a support portion, said transfer portion being positioned over said support portion for transfer, under conditions of heat and pressure, of the transfer portion from the support portion to an article, said support portion comprising
  (i) a carrier, and
  (ii) a release layer positioned over said carrier, said release layer being made of a non-wax, non-silicone, thermoset release material, said release layer separating cleanly from said transfer portion with no visually discernible portion of said release layer being transferred to the article along with said transfer portion.

2. The heat-transfer label as claimed in claim 1 wherein said wax is a paraffinic wax.

3. The heat-transfer label as claimed in claim 1 wherein said carrier is a transparent polyester film.

4. The heat-transfer label as claimed in claim 1 wherein said protective lacquer layer comprises a phenoxy resin.

5. The heat-transfer label as claimed in claim 1 wherein said release layer is in direct contact with said protective lacquer layer and the periphery of said heat-activatable adhesive layer.

6. The heat-transfer label as claimed in claim 1 wherein said carrier is a plastic film.

7. A label comprising:

(a) a transfer portion, said transfer portion comprising
  (i) an ink design layer, and
  (ii) an adhesive layer over said ink design layer, said adhesive layer comprising an anti-blocking agent; and (b) a support portion, said transfer portion being positioned directly over said support portion for transfer of the transfer portion from the support portion to an article, said support portion comprising
  (i) a carrier, and
  (ii) a release layer positioned over said carrier and in direct contact with said transfer portion, said release layer being made of a non-wax, non-silicone, thermoset release material, said release layer separating cleanly from said transfer portion with no visually discernible portion of said release layer being transferred to the article along with said transfer portion, said release layer being made by (A) coating onto said carrier a composition comprising (1) a functionalized alkyl monomer having a carbon chain length of at least 18 carbon atoms, (2) a crosslinking monomer reactive with said functionalized alkyl monomer, and (3) an initiator for effecting at least a partial cure between said functionalized alkyl monomer and said crosslinking monomer and (B) activating said initiator.

8. The label as claimed in claim 7 wherein said anti-blocking agent is migratory to the interface between said transfer portion and said support portion, thereby facilitating release of said transfer portion from said support portion.

9. The label as claimed in claim 8 wherein said anti-blocking agent is a wax.

10. The label as claimed in claim 9 wherein said anti-blocking agent is a paraffinic wax.

11. The label as claimed in claim 10 wherein said adhesive layer is a heat-activatable adhesive layer.

12. The label as claimed in claim 11 wherein said transfer portion further comprises a protective lacquer layer, said protective lacquer layer being positioned under said ink design layer and being in direct contact with said release layer.

13. A label comprising:

(a) a transfer portion, said transfer portion comprising
(i) a protective lacquer layer,
(ii) an ink design layer over said protective lacquer layer, and
(iii) a heat-activatable adhesive layer over said ink design layer, said heat-activatable adhesive layer comprising an anti-blocking agent, said anti-blocking agent being a paraffinic wax, said anti-blocking agent being migratory to the interface between said transfer portion and said support portion, thereby facilitating release of said transfer portion from said support portion; and (b) a support portion, said transfer portion being positioned directly over said support portion for transfer of the transfer portion from the support portion to an article, said support portion comprising
(i) a carrier, and
(ii) a release layer positioned over said carrier and in direct contact with said protective lacquer layer, said release layer being made of a non-wax, non-silicone, thermoset release material, said release layer separating cleanly from said transfer portion with no visually discernible portion of said release layer being transferred to the article along with said transfer portion, wherein said release layer is made by (a) coating onto said carrier a composition comprising (i) a functionalized alkyl monomer having a carbon chain length of at least 18 carbon atoms, (ii) a crosslinking monomer reactive with said functionalized alkyl monomer, and (iii) an initiator for effecting at least a partial cure between said functionalized alkyl monomer and said crosslinking monomer and (b) activating said initiator.

14. The label as claimed in claim 13 wherein said functionalized alkyl monomer is an alkyl vinyl ether monomer and wherein said crosslinking monomer comprises at least one multifunctional acrylate monomer.

15. A label comprising (a) a transfer portion, said transfer portion comprising
(i) a protective lacquer layer,
(ii) an ink design layer over said protective lacquer layer, and
(iii) a heat-activatable adhesive layer over said ink design layer, said heat-activatable adhesive layer comprising an anti-blocking agent, said anti-blocking agent being a paraffinic wax, said anti-blocking agent being migratory to the interface between said transfer portion and said support portion, thereby facilitating release of said transfer portion from said support portion; and (b) a support portion, said transfer portion being positioned directly over said support portion for transfer of the transfer portion from the support portion to an article, said support portion comprising
(i) a carrier, and
(ii) a release layer positioned over said carrier and in direct contact with said protective lacquer layer, said release layer being made of a non-wax, non-silicone, thermoset release material, said release layer separating cleanly from said transfer portion with no visually discernible portion of said release layer being transferred to the article along with said transfer portion, wherein said release layer is made by (a) coating onto said carrier a composition comprising (i) an alkyl vinyl ether monomer of the formula $C_nH_{2n+1}O—CH═CH$ wherein n is at least 18, (ii) a trifunctional acrylate monomer, (iii) a difunctional acrylate monomer and (iv) a free-radical initiator and (b) activating said free radical initiator.

16. A heat-transfer label comprising:

(a) a transfer portion, said transfer portion comprising
(i) a protective lacquer layer,
(ii) an ink design layer over said protective lacquer layer, and
(iii) a heat-activatable adhesive layer over said ink design and protective lacquer layers, said heat-activatable adhesive layer extending beyond the peripheries of said ink design and protective lacquer layers, said heat-activatable adhesive layer comprising a polyester resin and a wax; and (b) a support portion, said transfer portion being positioned over said support portion for transfer, under conditions of heat and pressure, of the transfer portion from the support portion to an article, said support portion comprising
(i) a carrier, and
(ii) a release layer positioned over said carrier, said release layer being made of a non-wax, non-silicone, thermoset release material, said release layer separating cleanly from said transfer portion with no visually discernible portion of said release layer being transferred to the article along with said transfer portion, wherein said release layer is made by (A) coating onto said carrier a composition comprising (1) a functionalized alkyl monomer having a carbon chain length of at least 18 carbon atoms, (2) a crosslinking monomer reactive with said functionalized alkyl monomer, and (3) an initiator for effecting at least a partial cure between said functionalized alkyl monomer and said crosslinking monomer and (B) activating said initiator.

17. The heat-transfer label as claimed in claim 16 wherein said functionalized alkyl monomer is an alkyl vinyl ether monomer and wherein said crosslinking monomer comprises at least one multifunctional acrylate monomer.

18. A heat-transfer label comprising:

(a) a transfer portion, said transfer portion comprising
(i) a protective lacquer layer,
(ii) an ink design layer over said protective lacquer layer, and
(iii) a heat-activatable adhesive layer over said ink design and protective lacquer layers, said heat-activatable adhesive layer extending beyond the peripheries of said ink design and protective lacquer layers, said heat-activatable adhesive layer comprising a polyester resin and a wax; and (b) a support portion, said transfer portion being positioned over said support portion for transfer, under conditions of heat and pressure, of the transfer portion from the support portion to an article, said support portion comprising (i) a carrier, and (ii) a release layer positioned over said carrier, said release layer being made of a non-wax, non-silicone, thermoset release material, said release layer separating cleanly from said transfer portion with no visually discernible portion of said release layer being transferred to the article along with said transfer portion, wherein said release layer is made by (A) coating onto said carrier a composition comprising (1) an alkyl vinyl ether monomer of the formula $C_nH_{2n+1}O—CH═CH$ wherein n is at least 18, (2) a trifunctional acrylate monomer, (3) a difunctional acrylate monomer and (4) a free-radical initiator and (B) activating said free radical initiator.

* * * * *